United States Patent Office 2,934,888
Patented May 3, 1960

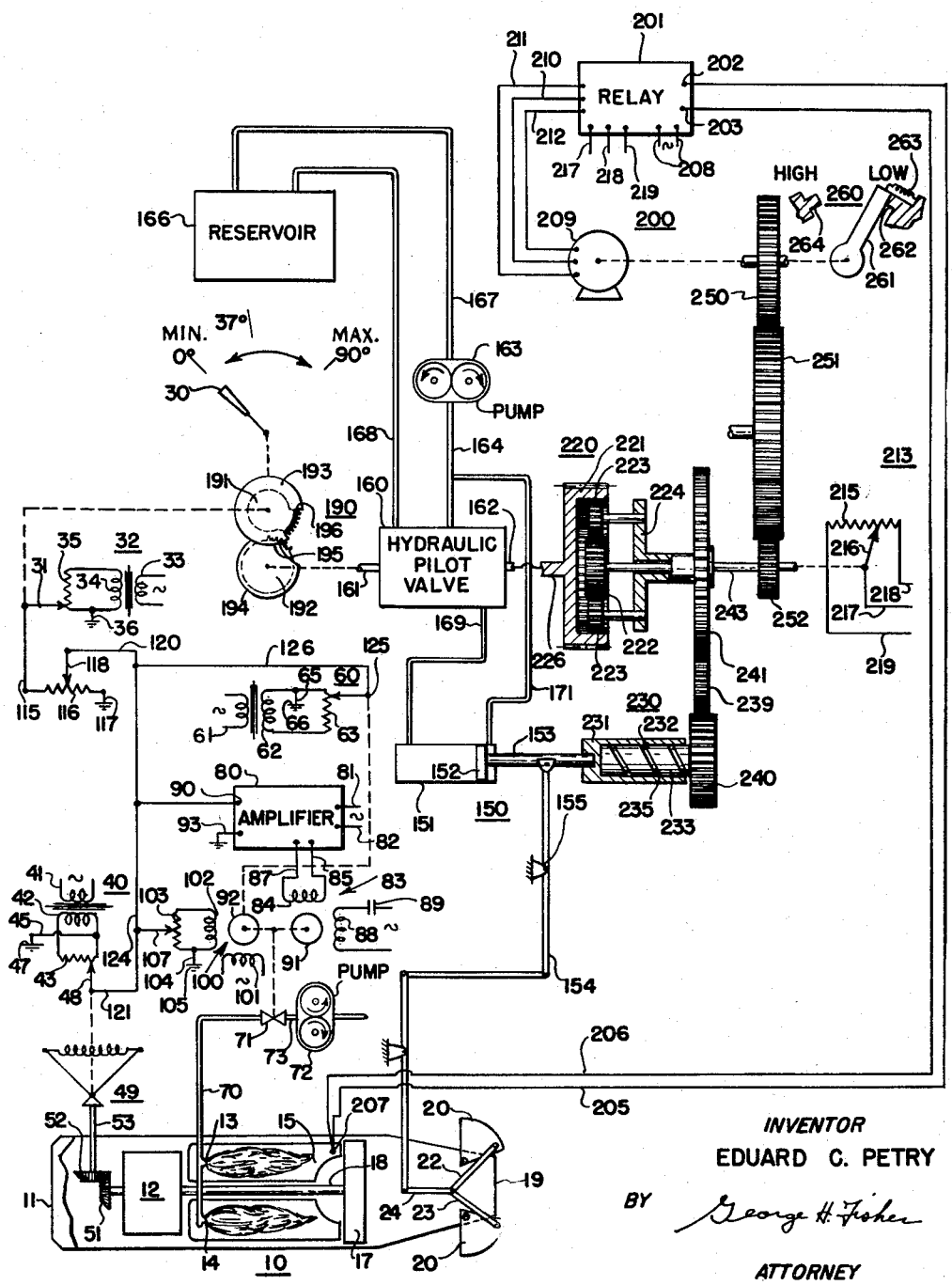

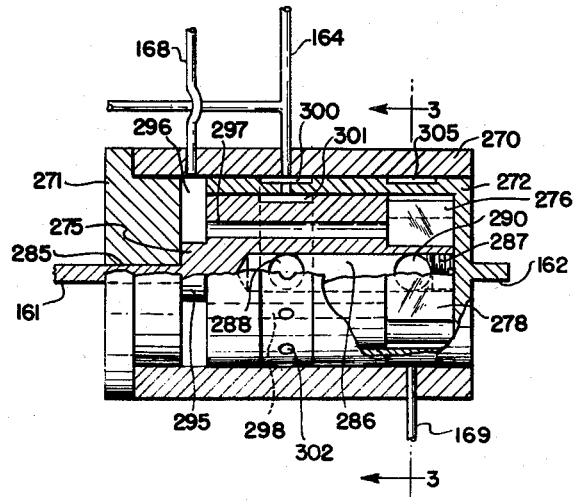
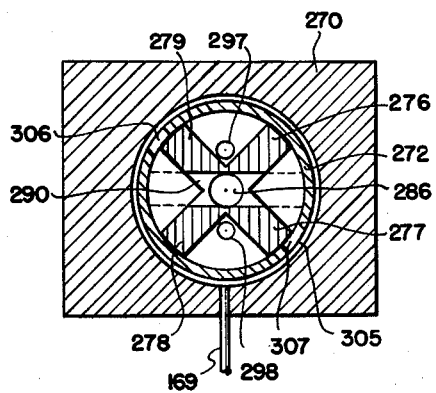

2,934,888

GAS TURBINE COMBUSTION ENGINE CONTROL APPARATUS FOR CONTROLLING THE EXHAUST AREA AND FUEL FLOW

Eduard C. Petry, Hopkins, Minn., assignor to Minneapolis-Honeywell Regulator Company, Minneapolis, Minn., a corporation of Delaware Application January 15, 1953, Serial No. 331,346

5 Claims. (Cl. 60—35.6)

The present invention is concerned with an improved type of control apparatus for the control of the exhaust gases of a combustion engine of the gas turbine or jet type. More particularly, the present invention is concerned with a type of control system where the control of the exhaust gases by the movement of the pilot's power lever can be modified by a temperature responsive means In controlling gas turbine engines of a jet type in which the thrust force of the engine is obtained from the acceleration of the gases passing through the engine and out of the tail cone of the engine to produce an impelling thrust on the jet engine, the shaft-thrust of the engine can be varied by changing the outlet area of the tail cone. There are many problems arising in the controlling of the power output of a jet engine; one is the internal gas temperature of the engine which, when excessive, can cause serious damage to the mechanism of the jet engine. When a pilot using a jet engine desires an accelerating condition, one method that such a condition is obtained is by closing the area of the tail cone and simultaneously changing the fuel flow to produce an added thrust, thus increasing the speed of the jet plane. Normally, on reducing the tail cone area of a jet engine, the pilot will observe the gas temperature indicator to ascertain that he does not close the jet area beyond that value at which destructive temperature condition would exist in the internal mechanism of the engine during both the transient and final steady states of operation.

In the present control system it is desired that provision be made for the controlling of a jet engine by the pilot's power lever through a hydraulic system which drives a hydraulic pressure actuating mechanism to position the "eyelids" and change the tail cone area. In order that the tail cone area is not reduced beyond a value that would cause the temperature of the engine to rise beyond a value considered dangerous, a temperature responsive means is employed to bias the hydraulic actuating mechanism, thus overriding the pilot's power control lever when such an excessive engine temperature condition exists.

It is therefore an object of the present invention to provide a control apparatus for combustion engine where the exhaust gases are controlled by a pilot's power lever and wherein the control can be overridden by a temperature responsive mechanism which receives a signal indicative of the temperature at some specific location inside the combustion engine.

A further object of the present invention is to provide a control apparatus for a combustion engine where the exhaust gases are proportionally controlled by a pressure responsive actuating mechanism and the control apparatus is modified or regulated by a temperature responsive means which receives a signal indicative of the temperature in the combustion engine.

These and other objects of the present invention will be understood upon considering the following specification and the appended drawings.

Figure 1 is a schematic drawing of one form of the combustion engine control apparatus.

Figure 2 is a cut away view of one form of the hydraulic pilot valve shown in the schematic drawing of Figure 1.

Figure 3 is a cross-sectional view of the hydraulic pilot valve shown in Figure 2.

Referring to Figure 1 an internal combustion engine of a gas turbine or jet type 10 which operates by receiving air at relatively high velocity into the front opening 11 to be compressed by a compressor 12 and mixed with burning fuel that flows from the nozzles 13 and 14 into a combustion chamber 15 of the engine. As the fuel is ignited and the gas increases in temperature the exhaust gases are forced through a turbine 17 that is connected to the compressor by a shaft 18. The reaction of the gases on the blades of the turbine 17 provides the power to rotate the compressor rotor to increase the amount of the air that enters the combustion chamber 15 through the compressor of the engine. The exhaust gas leaving the turbine flows through the tail cone at a higher velocity than the inlet air to complete the thermodynamic process of accelerating the gas thru the engine to produce a change in momentum of the gas and therefore a thrust force to propel the aircraft. The area of the tail cone 19 is controlled by a means such as the "eyelids" or shutter-like member 20 that can be opened and closed by the linkage members 22 and 23 connected to a further link member 24. The adjustment of area is done to vary the turbine back pressure, and therefore the pressure distribution throughout the engine. The combination of fuel flow and area settings is adjusted to give optimum performance for any desired engine operating condition. The aforementioned "eyelid" construction provides for a closing of the jet engine tail cone area when a force is applied to the linkage member 24.

The jet engine fuel control system disclosed in this specification is of the type commonly known as a constant speed fuel control system; however, the invention is not necessarily confined to the use of a fuel control system of this particular type. A pilot's power lever 30 is connected to a wiper 31 of a speed selective network 32 which comprises a transformer having a primary winding 33 and a secondary winding 34 having a potentiometer resistor 35 connected across the secondary winding to provide a series circuit of the winding 34 and the resistor 35. One end of the secondary winding 34 is connected to a ground connection 36 so that as the wiper 31 moves upwardly on the resistor 35, the output signal of the network 32 will increase in voltage value with respect to ground. Thus it is seen that as the pilot's power lever is moved through an angle of zero to 90 degrees the wiper 31 will move on the speed selective network 32 to provide an output signal which increases in value from a minimum to its maximum.

A speed indicating network 40 comprises a transformer having a primary winding 41 and a secondary winding 42 which has a potentiometer resistor 43 connected thereto so that a complete circuit exists through the secondary winding 42 and the resistor 43. The secondary winding 42 is connected at one end thereof by a conductor 45 to a ground connection 47. A wiper 48 movable along resistor 43 is positioned by a mechanical governor 49 of a conventional spring loaded fly ball type which causes mechanical motion of an output member proportional to the speed of rotation of the governor assembly, the ouput member being connected to wiper 48. The governor is driven by shaft 18 of the jet engine 10 through bevel gears 51 and 52 and a shaft 53 so that wiper 48 of the speed indicating network 40 will have a voltage signal thereon indicative of the speed of the shaft 18 of the engine.

A fuel valve position network 60 comprises a transformer having a primary winding 61 and a secondary winding 62 having a potentiometer resistor 63 connected across the same in series circuit relation. The secondary winding 62 is connected at one end thereof by a conductor 65 to a ground connection 66.

The aforementioned nozzles 13 and 14 are connected by a conduit 70 to a fuel metering valve 71 that is fed through a conduit 73 by a fuel pump 72 of the positive displacement type and includes a pressure limiting by-pass valve, not shown. The fuel pump 72 with its by-pass valve, produces a constant pressure so that the fuel flow to the engine is controlled by the metering valve 71 which in turn is controlled by motor 83.

Motor 83 is controlled by a discriminator type amplifier 80 that is preferably of the sort disclosed in the A. P. Upton Patent 2,423,534, issued July 8, 1947. The amplifier 80 is energized by an alternative current supply voltage to the terminals 81 and 82 and controls the energization of winding 84 of motor 83 connected by the conductors 85 and 87 to the amplifier. A second winding 88 of the motor 83 is fed by the same A.C. voltage supply through a condenser 89 which produces a phase shift in the voltage to the winding 88 with respect to the supply voltage of the winding 84 as furnished through the amplifier 80. An input signal received at the terminal 90 of the amplifier determines the phase and magnitude of the voltage that is applied to the winding 84, as made clear in the above patent. The rotation of a rotor 91 of the motor 83 will be in one direction when the phase of the winding 84 is of one value and in the other direction when the phase of the winding 84 is shifted 180 degrees and the speed of the motor depends on the voltage impressed on the winding 84. The input terminal 90 of the amplifier 80 is also connected by a conductor 124 to a speed responsive generator 100 that is mechanically coupled to the rotor 91 of the motor 83. This speed responsive generator is preferably of the type disclosed in the W. H. Gille Patent 2,581,093, issued January 1, 1952, which has an energizing winding 101 fed by the same alternating voltage which supplies the amplifier 80. An output winding 102 of the speed responsive generator 100 is connected to a potentiometer resistor 103 in a series circuit, and one end of the winding 102 is connected by a conductor 104 to a ground connection 105. A potentiometer wiper 107 connected to conductor 124 can be positioned along the potentiometer resistor 103 to change the effectiveness of the speed responsive generator 100 in the fuel valve control that will be hereafter explained.

The speed selective network 32 is connected to the input terminal 90 of the amplifier 80 from the wiper 31 through a conductor 115 to one end of a potentiometer resistor 116 that is grounded at its other end at 117, this latter arrangement constituting a sensitivity calibrating network. A wiper 118 adjustable along the potentiometer resistor 116 is connected by a conductor 120 to the input terminal 90 of the amplifier. The speed indicating network 40 is connected to terminal 90 of the amplifier from the wiper 48 by conductors 121 and 124. The fuel valve position network 60 is connected from wiper 125 to terminal 90 by conductor 126.

The output of the motor 83 is mechanically coupled through a gear train, not shown, to the fuel metering valve 71 and the wiper 125 of the network 60. As the amplifier 80 energizes the winding 84 to cause the rotor 91 of the motor 83 to move in one direction or the other to position the fuel metering valve 71 to increase or decrease the supply of fuel to the combustion chamber of the engine, the wiper 125 will be positioned on the resistor 63 in fuel valve position network 60.

Since the primary windings 33, 41 and 61, of the speed selecting network 32, the speed indicating network 40, and the fuel valve position network 60, respectively, are fed by the same A.C. voltage supply as the input terminals 82 of the amplifier 80 these networks are obviously of the A.C. voltage type. However, while alternating current is preferred for these circuits, it is contemplated that direct current networks, amplifiers, and the like may also be used. When the wipers 31, 48, and 125 are positioned at the grounded end of the resistors 35, 43, and 63, respectively, no signal is obtained from any of them. The transformers are connected to the A.C. voltage supply so that as the wipers 35, 43, and 63 move across the respective resistors, the phase relation of the output signals of the networks 40 and 60 are the same and the phase relation of the output of the network 32 differs from them by 180 degrees.

The exhaust nozzle area of the jet engine has heretofore been stated as being controlled by eyelids 20 which are adjusted by movement of the linkage member 24. A hydraulic pressure actuating mechanism 150, comprising a cylinder 151 containing a piston 152 movable therein is used to actuate the eyelids 20. A piston rod 153 extending from cylinder 151 is connected to a link member 154 which is pivoted at 155. The linkage member 154 is also connected to the member 24 so that upon movement of the piston 152 in such a direction as to pull the piston rod 153 into the cylinder 151, the eyelids 20 will close to decrease the exhaust area of the engine 10.

A hydraulic pilot valve 160 having two mechanical input connections 161 and 162 is supplied with fluid under pressure by pump 163 through a conduit 164, the fluid being obtained from a reservoir or source 166 through a conduit 167. A return conduit 168 is connected to the pilot valve 160 and the reservoir 166 so that on a demand for a flow of servo fluid, the fluid can be pumped from the reservoir to the valve and return to the reservoir through the conduit 168. An output conduit 169 from the pilot valve 160 is connected to the head end of cylinder 151. A conduit 171 is connected to the conduit 164 and to the piston rod end of the cylinder 151 to apply high pressure servo fluid to the side of the piston 152 having the smaller effective area.

The power lever 30 is connected to the input connection 161 of the hydraulic pilot valve 160 through a lost motion mechanism 190. The lost motion mechanism 190 comprises, for instance, a pair of gears 191 and 192 each having teeth only on a segment of its periphery so that when the first gear 191 is rotated by the lever 30, the second gear 192, connected to 161, will rotate through a portion of the total rotation of the gear 191. A disc 193 having a diameter greater than the gear 191 is mounted so that the plane of the gear 191 is adjacent and parallel to the plane of the disc 193. A second disc 194 is mounted adjacent gear 192 and in alignment with disc 193. Two curved portions of the outer periphery of the disc 194 are removed to form a pointed section 195. The radii of the curved portions are equal to the radius of the disc 193 so that the outer edge of the disc 193 will be received by one of the sectors formed on removal of the curved portions of the disc 194 when the gear and disc assembly 191 and 193 is rotated in one direction beyond the engagement position of the gears 191 and 192. When the gear is returned in the other direction to pass beyond the engagement position of the gears 191 and 192 the second curved sector that is formed by the removed portion of the disc 194 will receive the edge of the disc 193. A notch 196 in the disc 193 is to receive the pointed section 195 of the disc 194 formed by the intersection of the two curved edges. Thus, it is seen that beyond the angle of movement of the gear 191 at which point the gear teeth of the gears 191 and 192 do not engage, the disc 193 holds the disc and gear 194 and 192 in a fixed position. This lost motion mechanism provides for movement of the control lever 30 between zero and 90 degrees, but only a selected portion of this movement is transmitted to connection 161, the selected portion of the movement of the power lever 30 in this case being that from 37 to 90 degrees.

A temperature responsive network 200 of the same or similar type shown in Figure 4 of the T. R. Harrison et al.

Patent 2,300,742, issued November 3, 1942, comprises a relay and electronic network 201 which has input terminals 202 and 203 connected by conductors 205 and 206 to a thermocouple 207. The thermocouple 207 is positioned in the combustion chamber 15 of the jet engine 10. The relay 201 is connected to a source of A.C. supply voltage by the conductors 208. A reversible motor 209 is connected to the output terminals of the relay 201 by the conductors 210, 211, and 212. A rebalance network 213 comprises a potentiometer 215 and a wiper 216. The two extremities of the potentiometer 215 and the wiper 216 are connected to the relay 201 by the conductors 217, 218, and 219.

A mechanical integrating or summation or some sort of mechanical mechanism for combinining at least two signals shown at 220 is a planetary gear system or similar type comprising a ring gear 221, a sun gear 222, and one or more planet gears 223 mounted on a spider 224. A mechanical shaft 226 of mechanism 220 is connected to the ring gear 221 and the input shaft 162 of the hydraulic pilot valve 160.

A motion converter mechanism 230 comprises a cylindrical sleeve 231 closed at one and having a pin 232 projecting from the inside surface of the sleeve. A shaft 233 adapted to be received inside the cylindrical sleeve 231 has a spiral groove 235 about the periphery of the shaft arranged so that the pin 232 engages the spiral groove 235. The cylindrical sleeve 231 of the motion converter mechanism 230 is connected to the piston rod 153 of the hydraulic pressure actuating mechanism 150 so that the linear movement of the piston 152 of mechanism 150 will produce rotatable motion of the shaft 233. The shaft 233 is connected to the spider 224 of mechanism 220 by a gear train comprising gears 240, 239, and 241. There, movement of the shaft 153 into the cylinder 151 to decrease the exhaust area, will cause the spider to rotate counter-clockwise about the axis of mechanism 220 to readjust the input connection 162 of the hydraulic pilot valve 160. A shaft 243 is connected to the sun gear 222 of mechanism 220 and has the spider 224 freely pivoted thereon so that the shaft 243 and spider 224 can move independently. The motor 209 which is controlled by the output of the temperature indicating mechanism 200 is connected through gears to the shaft 243 of the mechanical mechanism.

A high and low stop mechanism 260 comprises an arm 261 operable by the gear 250. Normally when the thermocouple 207 of the temperature indicating mechanism 200 senses a low temperature, the arm 261 will be against a low stop 262 toward which it is biased by a spring 263, spring 263 being strong enough to return arm 261 to this position when no torque is applied by the output shaft of the motor 209. The arm 261 will abut high stop 264 when the temperature indicating mechanism 200 has reached the maximum travel of its output mechanism. Upon the movement of the arm 261 from the low stop 262 to the high stop 264, the sun gear 222 rotates in a clockwise direction. The previously mentioned wiper 216 of the follow-up potentiometer 213 of the temperature indicating mechanism 200 is connected to the shaft 243 and is used as a rebalance potentiometer for the temperature indicating mechanism 200 of which the operation will be explained in more detail later in the specification.

Referring to Figure 2, the hydraulic pilot valve 160 is shown in a cut-away detailed drawing. The valve comprises a hollow cylindrical body 270 having one end closed by a member 271 and a cylindrical sleeve 272 having one end closed and to which the input connection 162 is attached. A rotatable plug 275, to which the input connection 161 is attached at one end thereof, has four projecting members 276, 277, 278 and 279 arranged in the form of a cruciform, at the other end thereof. The plug 275 is rotatable within the cylindrical sleeve 272, and the input connection 161 of the plug 275 and the input connection 162 of the cylindrical sleeve 272 are aligned and extend in opposite directions. The plug 275 and cylindrical sleeve 272 are assembled in body 270 so that the input connection 161 of the plug 275 projects through a hole 285 of the member 271, the plug 275 and the cylindrical sleeve 272 being concentric with the bore in body 270.

A chamber 286 is formed in the plug 275 and extends from the end opposite the input connection 161 along the axis of the plug 275 beyond the midpoint. The opening end of chamber 286 is sealed off by a plug 287. A passage 288 extends diametrically through the plug 275 at its midpoint and connects with chamber 286. A passage 290 extends diametrically through the right end of the plug and connects chamber 286 to the chambers between the projecting members 276 and 277 and the projecting members 278 and 279. A portion 295 of the plug 275 forms a spacer member to provide a chamber 296 inside the hollow cylindrical body 270 between the end of the rotatable plug 275 that has the input connection 161 connected thereto and the member 271. The chamber 296 is connected to the conduit 168 that is connected to the reservoir 166 and acts as a return or sump flow passage. A pair of spaced passages 297 and 298 extend parallel to the axis of the plug 275 and connect the chamber 296 to the chambers between the projecting members 279 and 276 and the projecting members 277 and 278, respectively. An annular groove 301 about the plug 275 connects the opposite ends of passage 288 and is aligned with an annular groove 300 about the cylindrical sleeve 272 so that a series of holes 302 through the cylindrical sleeve 272 about the circumference of the sleeve connects the groove 301 to the annular groove 300. The conduit 164 is connected to the space formed by the annular groove 300. A second annular groove 305 in the hollow cylindrical sleeve 272 is axially spaced from the annular groove 300 and adjacent to the end of the cylindrical sleeve 272 having the input connection 162, this groove registering with the output fluid conduit 169.

Referring to Figure 3, which is a sectional end view of the pilot valve shown in Figure 2 passages 306 and 307 are diametrically oppositely arranged in the sleeve 272 to connect the annular groove 305 to the chambers between the cruciform shaped projections 276, 277, 278, and 279, the projections being arranged to control flow through these latter passages.

*Operation*

As the combustion engine control apparatus is shown in Figure 1 the jet engine 10 would not be operating for the power lever 30 is shown in the off position, which is the zero degree position.

Assume that we begin operation of the jet engine 10 by advancing the power lever 30 a few degrees. The wiper 31 will move upward on the resistor 35 so that the speed selecting network 32 will provide an output signal fed by the conductors 115 and 120 to the input terminal 90 of the amplifier 80. The signal will pass through the calibration network comprising the resistor 116 and wiper 118 which is predeterminately set at a position for the particular characteristics of the jet engine fuel system. Upon receiving the signal from the speed selecting network 32, the fuel valve amplifier 80 will cause energization of the winding 84 of the fuel valve motor 83 to open the fuel metering valve 71.

Not shown in this specification or drawings, a starting means would be used to turn the jet engine shaft 18 to such a speed at which the jet engine would be self sustaining. Simultaneously with the advancing of the power lever 30 it is therefore assumed that the jet engine is being cranked by an external starting device so that the speed of the jet engine can be brought up to approximately 2000 r.p.m. before the external starting device is removed. Also not shown in this specification and drawings, an ignition means would be employed to ignite the fuel escaping from the nozzles 13 and 14 as the starting device previously mentioned rotated the shaft of the jet engine. Assuming now that the jet engine is self sustaining at a speed slightly greater than 2000 r.p.m., the mechanical governor 49 would move the wiper 48 across the resistor 43 of the speed indicating network 40 so that a signal indicative of the speed of the jet engine would be obtained from the network, to be added to the signal from the speed selecting network 32. The fuel valve position indicating network 60 would also produce an output signal upon the movement of the wiper 125 across the resistor winding 63 as the fuel valve motor 83 opens the fuel metering valve 71. The signals from the speed indicating network 40 and the fuel valve position indicating network 60 would be fed into the input terminal 90 of the amplifier 80. The output signal of the speed responsive generator is so connected that upon operation of the fuel metering valve motor 83, the rotor 92 of the speed responsive generator 100 will turn in a direction to produce an output signal from the generator that will tend to satisfy the amplifier 80 by balancing out signals calling for valve operation. As soon as the amplifier no longer has an input signal and the fuel metering valve motor 83 slows, the output signal of the speed responsive generator 100 will be reduced. The fuel valve amplifier 80 may then again have a signal calling for operation of the fuel valve motor and again energize the motor. The use of the speed responsive generator 100 in such a fuel metering valve circuit is to prevent "hunting" or the oscillation between the fuel valve control circuit and the speed indicating control circuit. The effectiveness of the speed responsive generator 100 can be controlled by the position of the wiper 107 on the potentiometer 103.

The type of fuel valve control system shown is commonly known as a constant speed control system; however, the invention is not limited to this type of system. Upon advancing the power lever up to a position of 37 degrees, the output of the speed indicating network 32 produces a signal that is sufficient to bring the jet engine up to full speed and any further movement of the power lever between the positions 37 to 90 degrees will control only the position of the eyelids 20 of the exhaust nozzle 19 of the jet engine. Now, assume that the power lever is in the position of 37 degrees and the potentiometer wiper 31 has moved across the potentiometer winding 35 of the speed selecting network 32. The speed indicating network signal fed into the input terminal 90 of the amplifier 80 and the fuel valve motor 83 will then operate to open the fuel metering valve 71. At the same time that the rotor 61 of fuel metering valve motor 83 rotates, the speed responsive generator rotor 92 operates and the wiper 125 moves. The fuel metering valve 71 will open until the signal from the fuel valve position network 60 cancels the signal from the speed selecting network 32. As the jet engine rotor and shaft 18 came up to speed, the wiper 48 moved across the potentiometer 43 of the speed indicating network 40 the output signal of the network was fed into the input terminal 90 of the amplifier 80. Since the output signal of the speed indicating network 40 is added to the output signal of the fuel valve position network 60, the sum of the two signals will tend to exceed the signal from the speed selecting network 32 and thus cause operation of the motor 83 in the opposite direction to close the fuel metering valve 71. Upon a closing motion of the fuel metering valve 71, the input fuel to the jet engine decreases and thus the speed will decrease, to then begin another cycle of the control between the speed indicating and fuel valve position networks 40 and 60 until an equilibrium condition is reached where the output signals from the speed indicating network 40 and the fuel valve position indicating network 60 will balance the signal from the speed selecting network 32. Thus it is seen that at a selected position of the power lever 30, the fuel control network will tend to maintain the jet engine shaft 18 at the selected speed due to the operation of a mechanical governor 49.

Let us now assume that the power lever 30 is advanced beyond the position of 37 degrees. The power lever 30 is connected to the input connection 161 of the hydraulic pilot valve 160 through a lost motion mechanism 190. The power lever 30 is movable through an angle of 90 degrees, that is from zero to 90 degrees, so that the wiper 31 can be positioned on the potentiometer 35 of the speed selecting network 32; however, due to lost motion mechanism 190, movement of the input connection 161 of the hydraulic pilot valve 160 is only accomplished during the movement of the power lever 30 between the 37 to 90 degree positions of a total movement of the power lever. During the zero to 37 degree movement of the power lever 30, at which time the input connection 161 is held in a fixed position, the hydraulic pilot valve 160 is in a position as shown in Figures 2 and 3 so that the servo fluid at a high pressure is not only admitted to the chamber of the cylinder 151 on the side of the piston 152 having the smaller effective area but also to the other side of the piston 152. With the servo fluid at a high pressure on both sides of the piston 152 the resultant force of the pressure of the servo fluid on the piston will operate to maintain the exhaust area of the jet engine 10 at a maximum value.

Let us assume that the power lever is advanced beyond the 37 degrees position and the gear teeth of the gears 191 and 192 are engaged so that the input connection 161 of the hydraulic pilot valve 160 is rotated. The plug 275 driven by 161, as shown in Figure 3 is in a position in which it is held by the locking of the input connection 161 by the lost motion mechanism 190 during the movement of the power lever between the zero and 37 degree positions. This position of the plug 275 connects the conduit 169 to the pressure conduit 164 so that high pressure is applied to both sides of the piston 152 as mentioned above. As the power lever is operated beyond the 37 degree position, the plug 275 will rotate counter-clockwise to close the ports 306 and 307 to cut off the flow of servo fluid from the pump. Further movement of the power lever then connects the low pressure or reservoir side 296 of the hydraulic pilot valve to the cylinder 151 through passages 297 and 298. This will cause the high pressure source of servo fluid on the piston rod side of the piston 152 to move the eyelids 20 towards a closed position. At the same time, the cylindrical sleeve 272 will be rotated counter-clockwise by the follow-up motion of the piston acting through the motion converter mechanism 230 and mechanism 220.

A slight reverse movement of the power lever will rotate the plug 275 in clockwise direction and the servo fluid will then pass from the pump 163 to the pressure actuator mechanism 150 through conduit 164, passages 286 and 290 to the chambers bounded by the projections 276 and 277, and the projections 278 and 279 and then through ports 306 and 307 to the conduit 169 which connects to the head end of cylinder 151.

Now assume htat the power lever has been increased to a position of 80 degrees and that the plug 275 is rotated counter-clockwise and the sleeve 272 has rotated counter-clockwise to follow-up and cover the ports 306 and 307 at a balanced condition. As above described, this will tend to cause member 20 to pivotally close exit 19 of the engine and will raise the operating temperature therein.

Upon an excessive temperature in the combustion chamber 15 of the engine 10 being reached, the temperature indicating mechanism 200 will cause motion of the mechanical integrating mechanism through the sun gear 222 in a direction to rotate 162 and sleeve 272 in a clockwise direction and thus cause an increased servo output pressure to the head end of actuator 150 through conduit 169. This increased pressure will cause the tail cone eyelids 20 to move toward an open position thus relieving the excessive temperature condition in the engine 10. This hydraulic system is essentially a force balance system wherein the final position of the piston and the relative position of the parts in the valve are such that the "eyelid" force reaction of the piston rod is balanced by the pressure difference across the piston. Thus, the feedback does not give an absolute positional signal of the piston position, since the port in the valve does not completely close but closes to a point where the forces are balanced.

While the hydraulic pilot valve shown accomplishes the function necessary in this combustion engine control apparatus, the invention is not dependent upon this type of pilot valve.

Again referring to Figure 1 the temperature indicating mechanism 200 includes a thermocouple 207 located in the combustion chamber 15 of the engine. As shown, the temperature indicating mechanism is at a position, indicating or responsive to a low temperature in the combustion chamber 15, the arm 261 being against the low stop 262 of the stop mechanism 260. As the temperature of the combustion chamber 15 increases, the voltage output of the thermocouple 207 will be sensed by the relay or electronic amplifier 201 and there render the motor 209 operative. The motor will then through gears 250, 251, and 252 rotate shaft 243 and sun gear 222 of mechanical mechanism 220. Also, operation of motor 209 will move stop arm 261 toward the high stop 264 of stop mechanism 260 against the bias spring 263. Spring 263 is strong enough to cause a positive return of the temperature indicating mechanism to the low temperature position upon electrical failure of any of the components of the mechanism 200. Operation of motor 209 through gears 250, 251 and 252 adjusts wiper 216 across resistor 215 of the rebalance network 213 to rebalance the signal that is obtained from the thermocouple 207. Thus, within the operating range of temperatures in the combustion chamber 15 of the engine the motor 209 will be positioned and the wiper 216 will be adjusted along resistor 215 to produce a signal from the rebalance network 213 to exactly balance the output signal of the thermocouple 207.

The motion converter mechanism 230 translates the linear motion of piston rod 153 linear to a rotational movement of the output gear 240 of the motion converter mechanism 230. In this manner, the motion converter mechanism 230 connects the piston 152 of the hydraulic actuator 150 to mechanical mechanism 220 to provide a follow-up signal into the hydraulic pilot valve 160 indicative of the position of the shutter members 20. As previously pointed out, the mechanical integrating mechanism 220 combines the signals from the motion converter mechanism 230 and the temperature indicating network 200 and uses the combined or summed signal to position shaft.

Assume that the power lever 30 is advanced to its maximum position of 90 degrees and the piston 152 is accordingly forced to the left to close the eyelids 20 and thus decrease the area of the exhaust nozzle 19 of the jet engine 10. The cylindrical sleeve 231 of the motion converter mechanism 230, in moving to the left, coacts with pin 232 to cause rotational movement of the shaft 233 and the gear 240, as well as gear 239 and 241 to mechanically follow-up this operation. The closing movement of the eyelids 20 of the engine 10 causes greater power to be developed from the engine and also causes the back pressure on the engine to increase. This causes the internal temperature of the engine to rise, with the increased temperature being sensed by the thermocouple 207. As the eyelids continue to close and the temperature in the combustion chamber 15 of the jet engine 10 increases, the thermocouple 207 will cause the temperature indicating network 200 to operate the motor 209 in a direction to rotate, through the sun gear 222 of the mechanical integrating mechanism 220, the sleeve 272 of the valve 160 in a direction to terminate the eyelids closing motion of actuator mechanism 150. Should the temperature continue to rise in the combustion chamber 15, temperature indicating mechanism 200, through motor 209 and its associated mechanism, including valve 160, will operate the hydraulic actuator mechanism 150 in a direction to open the eyelids 20 of the jet engine 10.

Normally, in a jet engine having automatic control apparatus, a method of emergency control is available. Then, upon an electrical failure of the control apparatus, the pilot would immediately shift to the emergency control means. With such an arrangement, it is desired that the pilot also have full control of the exhaust nozzle eyelids 20. To provide for full control of the exhaust nozzle members 20 by the pilot upon a transfer to the emergency controls, the output shaft of motor 209, controlled by temperature indicating network 200, is biased to a low temperature position by the bias spring 263, as before described. Assuming that the arm 261 is against the high temperature stop 264, which would result in a maximum temperature bias to open the eyelids 20 of the exhaust nozzle 19, an electrical failure of relay 201, for instance, would permit the spring 263 to return the arm 261, as well as the gear train and sun gear 222 to the low temperature bias position or on an eyelid closed position. This provides for the full control of the position of the eyelids of the jet engine by the pilot. If the return spring 263 were not used and the eyelids were open due to a relatively large signal from the temperature bias mechanism 200 and a switch over to emergency (manual) operation was made without returning the temperature indicating lever 261 to the low temperature stop 262, the pilot would not be able to close the eyelids of the tail cone area of the engine 10 through the full range of movement of the eyelids since the bias of the temperature indicating mechanism 200 would offset the control of the power lever over the hydraulic actuating mechanism 150 to some extent.

While many other modifications will be obvious to those skilled in the art, it is intended that the present invention be limited in scope by the appended claims.

I claim as my invention:

1. Apparatus for controlling the flow of exhaust gases of a combustion turbine comprising, in combination, a source of hydraulic pressure, a hydraulic cylinder containing a piston movable axially in said cylinder, said piston being adapted to adjust a gas flow control device, a pair of hydraulic conduits, hydraulic connecting means connecting one of said pair of conduits to one end of said cylinder and the other of said pair of conduits to the opposite end of said cylinder, a hydraulic pilot valve, said hydraulic pilot valve having two input control connections, hydraulic connecting means connecting said source of hydraulic pressure to said hydraulic pilot valve, hydraulic connecting means connecting said pair of hydraulic lines to said hydraulic pilot valve, a motion converter comprising a hollow sleeve having a pin projecting from the inner surface inside surface and a shaft having a spiral groove about the inner surface thereof, said hollow sleeve being adapted to receive said shaft so that said pin follows said spiral groove to produce rotation of said shaft on axial movement of said hollow sleeve, mechanical connecting means connecting said hollow sleeve to said piston, temperature responsive means comprising an amplifier and a thermocouple circuit, electrical connecting means connecting said thermocouple circuit to said amplifier, a motor, said motor being controlled by said amplifier, mechanical integrating means comprising a planetary gear system having a ring gear, one or more planetary gears, and a sun gear, mechanical connecting means connecting one of said input control connections of said hydraulic pilot valve to said ring gear, a gear train, mechanical connecting means connecting said motor and said gear train to said sun gear, mechanical connecting means connecting said shaft to said planetary gears, a potentiometer having a resistance winding and a wiper, mechanical connecting means connecting said wiper to said sun gear, electrical connecting means connecting said potentiometer to said temperature responsive means, spring operated return bias means connected to said gear train, said return bias means returning said sun gear to an initial position of no temperature signal upon electrical failure of said amplifier, a lost motion mechanism, mechanical connecting means connecting said lost motion mechanism to the other of said input control connections of said hydraulic pilot valve, a control lever, and mechanical connecting means connecting said control lever to said lost motion mechanism so that movement of said control lever over a segment of the total travel is effective to control the operation of said piston.

2. Control apparatus for controlling the flow of exhaust gases from a combustion turbine comprising, a source of hydraulic pressure, hydraulic pressure operated actuating means for adjusting an exhaust gas flow control device, pilot valve control means, first hydraulic connecting means connecting said pressure operated actuating means to said pilot valve control means, second hydraulic connecting means connecting said source of hydraulic pressure to said pilot valve cotrol means, said pilot valve control means having two input control connections, a motion converter comprising a hollow sleeve having a pin projecting from the inside surface and a shaft having a spiral groove formed in the inner surface thereof, said hollow sleeve being adapted to receive said shaft so that said pin follows said spiral groove to produce rotation of said shaft on axial movement of said hollow sleeve, mechanical connecting means connecting said hollow sleeve to said pressure operated actuating means, temperature responsive means comprising an amplifier and a thermocouple circuit, electrical connecting means connecting said thermocouple circuit to said amplifier, a motor, said motor being controlled by said amplifier, mechanical integrating means comprising a planetary gear system having a ring gear, one or more planetary gears, and a sun gear, mechanical connecting means connecting one of said input control connections of said hydraulic pilot valve to said ring gear, a gear train, mechanical connecting means connecting said motor through said gear train to said sun gear, mechanical connecting means connecting said shaft to said planetary gears, a potentiometer having a resistor and a wiper, mechanical connecting means connecting said wiper to said sun gear, electrical connecting means connecting said potentiometer to said temperature responsive means, spring operated return bias means connected to said gear train, said return bias means returning said gun gear to an initial position of no temperature signal upon electrical failure of said amplifier, a lost motion mechanism, mechanical connecting means connecting said lost motion mechanism to the other of said input control connections of said hydraulic pilot valve, a control lever, and mechanical connecting means connecting said control lever to said lost motion mechanism so that movement of said control lever over a segment of the total travel is effective to control the operation of said pressure operated actuating means.

3. Control apparatus for controlling the flow of exhaust gas of a jet turbine, comprising in combination, a source of hydraulic servo pressure, hydraulic pressure operated actuating means for varying the position of the eyelids of a jet turbine, pilot valve control means, first hydraulic connecting means connecting said source of hydraulic servo pressure to said pilot valve control means, second hydraulic connecting means connecting said pressure operated actuating means to said pilot valve control means, motion converting means, said last mentioned means being connected to said actuating means, temperature responsive means, mechanical integrating means comprising a ring gear, a sun gear, and one or more planetary gears, mechanical connecting means connecting said motion converting means and said temperature responsive means to said mechanical integrating means, a potentiometer having a resistance winding and a wiper, said potentiometer being a component of said temperature responsive means, spring operated return bias means connected to said sun gear, said return bias means returning said sun gear to an initial position of no temperature signal upon failure of said temperature responsive means, a lost motion mechanism, mechanical connecting means connecting said lost motion mechanism to the other of said input control connections of said hydraulic pilot valve, a control lever, and mechanical means connecting said control lever to said lost motion mechanism so that movement of said control lever over a segment of the total travel is effective to control the operation of said pressure operated actuating means.

4. Control apparatus for controlling the flow of exhaust gas of a combustion engine comprising, in combination, a source of hydraulic servo pressure, hydraulic pressure operated actuating means for varying the position of the eyelids of the engine, pilot valve control means, first hydraulic connecting means connecting said source of hydraulic servo pressure to said pilot valve control means, second hydraulic connecting means connecting said pressure operated actuating means to said pilot valve control means, motion converting means, said last mentioned means being connected to said actuating means, temperature responsive means, electrical connecting means connecting said temperature responsive means to said amplifier, mechanical integrating means, mechanical connecting means connecting said motion converting means and said temperature responsive means to said mechanical integrating means, electrical rebalance means connected to indicate the response of said temperature responsive means, return bias means for cancelling effect of temperature responsive means, control means, and lost motion means for selectively receiving a signal from said control means.

5. In control apparatus for a combustion engine having means for controlling the flow of exhaust gases, servo actuator means for actuating said flow controlling means, means responsive to a condition indicative of combustion temperature of the engine, means including a lost motion mechanism for selecting a desired operating condition of said engine, controller means for controlling said servo actuator actuating means, said controller means including two movable members so arranged that the control of said actuating means by said controller means results from the cooperative movement of said two members, follow-up means responsive to the operation of said flow controlling means, one of said controller members being operated in response to said selecting means through said lost motion mechanism and the other of said controller members being operated in response to said temperature responsive means and said follow-up means.

References Cited in the file of this patent

UNITED STATES PATENTS

| | | |
|---|---|---|
| 2,105,473 | Dean | Jan. 18, 1938 |
| 2,199,416 | Paulson | May 7, 1940 |
| 2,382,707 | Gosslau et al. | Aug. 14, 1945 |
| 2,514,248 | Lombard et al. | July 4, 1950 |
| 2,516,909 | Redding et al. | Aug. 1, 1950 |
| 2,520,967 | Schmitt | Sept. 5, 1950 |
| 2,541,805 | Berkey et al. | Feb. 13, 1951 |
| 2,564,127 | Orr | Aug. 14, 1951 |
| 2,706,886 | Michel | Apr. 26, 1955 |
| 2,720,751 | Kunz | Oct. 18, 1955 |
| 2,734,340 | Wood | Feb. 14, 1956 |
| 2,772,378 | Farkas | Nov. 27, 1956 |
| 2,776,536 | Chudyk | Jan. 8, 1957 |

FOREIGN PATENTS

| | | |
|---|---|---|
| 612,163 | France | July 26, 1926 |